Dec. 4, 1956 J. FUTTERMAN 2,773,136

AMPLIFIER

Filed July 30, 1953

INVENTOR.
JULIUS FUTTERMAN
BY James and Franklin
ATTORNEY

United States Patent Office 2,773,136

Patented Dec. 4, 1956

2,773,136

AMPLIFIER

Julius Futterman, New York, N. Y.

Application July 30, 1953, Serial No. 371,318

13 Claims. (Cl. 179—171)

This invention relates to amplifiers, and more particularly to audio-frequency power amplifiers employing large amounts of negative feedback to reduce distortion, and is therefore useful in the reproduction of speech and music.

High fidelity amplifiers heretofore have required an expensive output transformer to get an efficient power match between the amplifier and a low impedance load, and because of the unavoidable phase shifts occurring in the transformer, have been limited as to the amount of negative feedback that could be used. If the output stage of an amplifier is arranged in push-pull then the power tubes must be operated in Class "A" rather than in the more efficient Class "$AB_1$" or Class "$B_1$" arrangement, in order to avoid a form of high frequency distortion that is not alleviated by negative feedback, caused by switching transients set up in the output transformer, as is described by Mr. A. P. Sah, in "The Proceedings of the I. R. E.," November 1936.

One object of my invention is to provide a low cost power amplifier that does not use an output transformer, and is capable of supplying large amounts of undistorted power directly to a low impedance load of the order of 16 ohms, such as the voice coil of a conventional loudspeaker.

Another object of my invention is to provide a power amplifier useful over the audio range of 20 cycles to 20 kc. and capable of utilizing large amounts of negative feedback, of the order of 60 db, without instability.

Still another object of my invention is to provide a balanced push-pull output stage operating Class "$B_1$," in a power amplifier of the type described, using series connected power tubes wherein each half of the output stage has its own power supply.

A principal object of my invention is to provide a novel method of symmetrically driving the above described output stage so as to obtain maximum undistorted output.

A still further object of my invention is to provide a circuit arrangement in an amplifier, such that a low impedance load is connected directly in series with the input circuits of all the tubes used in the amplifier, for the purpose of obtaining both positive and negative feedback without instability.

To accomplish the foregoing objects, and other more detailed objects which will hereinafter appear, my invention resides in the power amplifier and power supply elements, and their relation one to another, as are hereinafter more particularly described in the following specification. The specification is accompanied by a drawing, in which.

Figure 1:
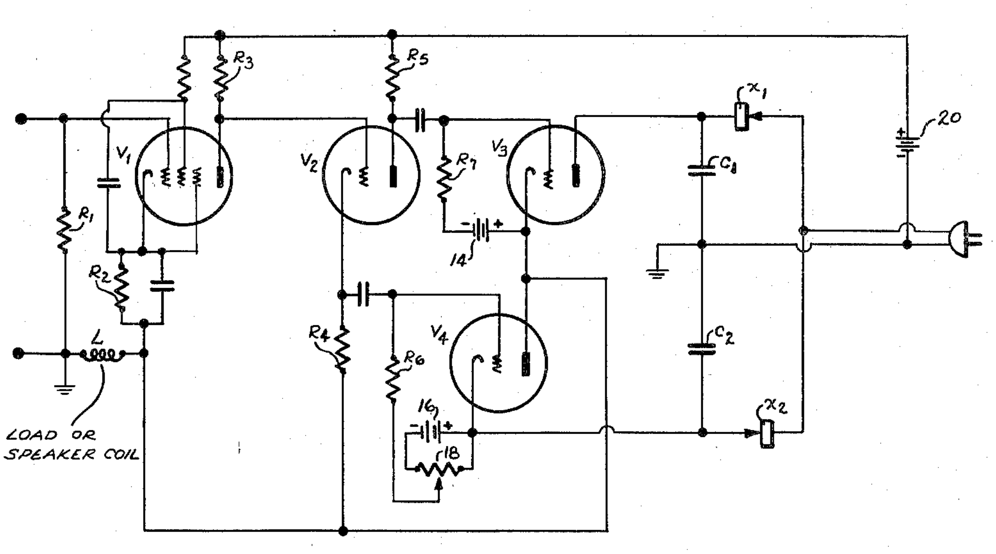
Fig. 1 is a simplified schematic diagram of one form of my invention.

Referring first to Fig. 1, vacuum tube V1, which may be a type 6AU6 or similar pentode tube, is connected to operate as a high gain voltage amplifier tube by reason of its large plate load resistor R3, which is of the order of one or two megohms. The plate of tube V1 is directly connected to the grid of tube V2, which is connected to act as a split-load phase inverter. Signal voltages developed across a resistor R5 are applied between grid and plate of a power output tube V3. Likewise signal voltages developed across a similar resistor R4, which are 180 degrees out of phase with those developed across resistor R5, are applied between grid and plate of a power output tube V4.

The power output tubes V3 and V4 should preferably be of the low Mu, high perveance type, that is, tubes capable of passing large plate currents at zero grid bias, such as type 6082 or type 12B4 tubes. Although tubes V3 and V4 are shown in the diagram as single tubes, they may each consist of several tubes with their respective elements connected together in parallel for more power output.

The plate of tube V3 is connected to the positive side of a low impedance power supply consisting of a rectifier X1 and a capacitor C1. The negative side of this supply is grounded. The cathode of tube V4 is connected to the negative side of an identical power supply consisting of a rectifier X2 and a capacitor C2. The positive side of this supply is grounded. The capacitors C1 and C2 each may have a value of, say, 660 mfd. The cathode of tube V3 is directly connected to the plate of tube V4. The output load L is also connected to this point and to ground.

The control grids of the two tubes V3 and V4 are biased negatively by means of the batteries 14 and 16 shown. The amount of bias for these tubes is not critical. The bias should not be so low that the plate current causes the rated plate dissipation of the tubes to be exceeded. A high negative bias, almost to the point of plate current cut-off is preferable, for in that case a much higher plate voltage can be applied to the power tubes without exceeding their rated plate dissipation.

The grid bias of tube V4 is made slightly adjustable by means of a potentiometer 18. The plate current of tube V4 is made equal to the sum of the plate currents of tube V3 plus tube V2. Because these currents flow through the load in opposite directions, and are equal, they will cancel and there will consequently be zero voltage across the load. The signal voltages previously referred to, however, will cause a voltage to appear across the load. If, for example, the grid of tube V3 should become less negative then at the same instant the grid of tube V4 would become more negative, consequently the plate current of tube V3 would increase and that of tube V4 would decrease or be reduced to zero. The difference between these two currents would thus flow through the load.

The plate voltages for tubes V1 and V2 are obtained from a third power supply, here shown as B battery 20. The output voltage from this supply should be in the order of 450 volts, and should be well filtered. This is no problem, however, because the current requirement for tubes V1 and V2 is very small, being only approximately 5 milliamperes.

The cathode load resistor R4 of the phase inverter tube V2 is returned to the negative side of its power supply, which is at ground potential, through the load, here indicated by the coil L. This is a novel feature of my invention, and it is by reason of this connection that the output tubes V3 and V4 are driven symmetrically by the signal voltages developed across the two equal resistors R4 and R5. If resistor R4 were connected to ground directly, as is conventional, instead of through the load, then the power output tubes V3 and V4 would not be driven symmetrically. The signal voltage developed across resistor R5 would be applied to output tube V3 between grid and plate, and signal voltage developed across resistor R4 would be applied to output tube V4 between grid and cathode. Signal voltages large enough to drive the grid of output tube V4 to zero bias would still leave the grid of output tube V3 substantially negative, thus reducing the maximum power output available from the amplifier.

Because the signal voltages developed across the resistors R5 and R4 are applied between grid and plate, respectively, of the power tubes V3 and V4, then the effective grid to cathode signal voltage applied to each tube is the grid to plate signal voltage minus the signal voltage appearing across the load. In other words, output tubes V3 and V4 are driven in cathode follower fashion. Normally this would require a large signal voltage input to the phase inverter tube V2, but because the load L is also in the input circuit of the phase inverter tube V2, the signal voltage appearing across the load is in series and is in proper sense to add to the signal voltage applied to the input of the phase inverter tube V2, thus reducing the amount of signal voltage required from the output of volttage amplifier tube V1. In other words, in respect to tube V2, there is positive feedback.

The input circuit of tube V1 also includes the output load L. A signal voltage across the resistor R1 will produce an output voltage across the load L such as to oppose the signal voltage. With this arrangement negative feedback ratios of as high as 60 db can be used without instability.

Because of the large amount of negative feedback available, the power supplies for the output tubes are extremely simple, each consisting of a metallic rectifier and capacitor. If with no feedback the ripple voltage from the power supplies, across the output load, were one volt, then with 60 db of negative feedback this voltage would be reduced to one millivolt.

Figure 2:
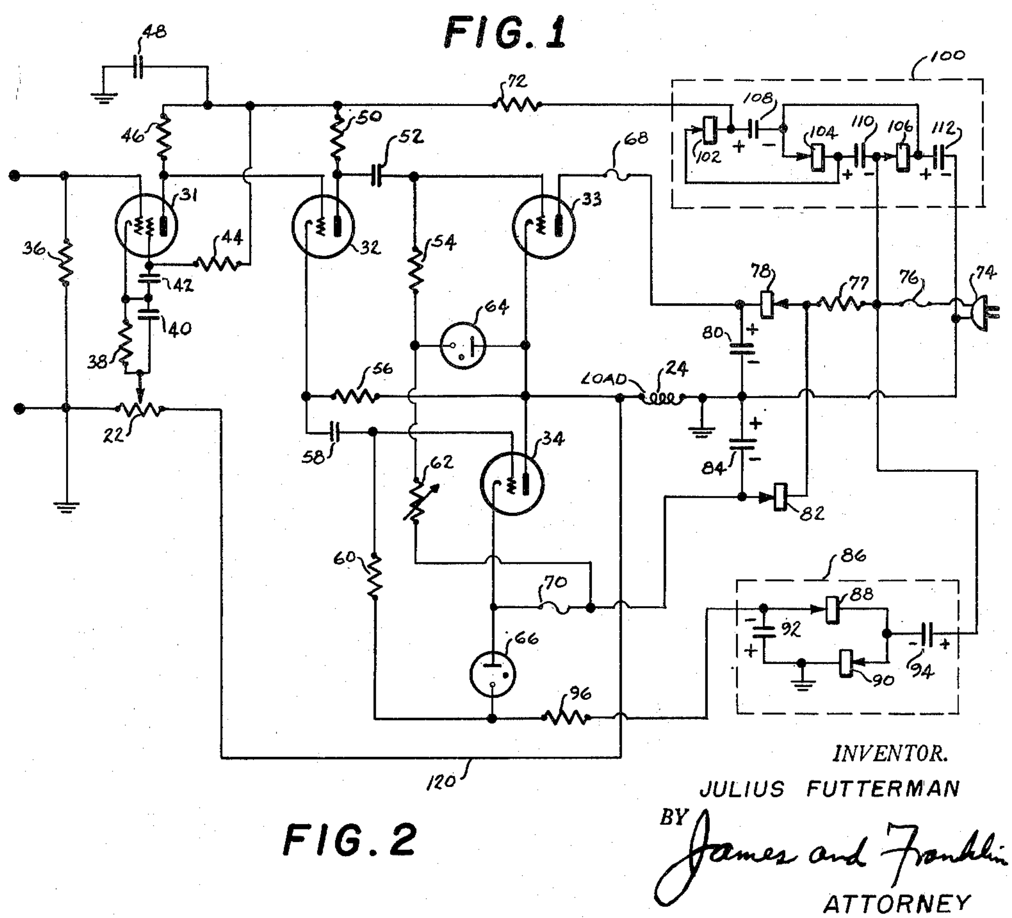
Fig. 2 is a more detailed schematic diagram of a preferred form of the invention.

Fig. 2 is a schematic diagram of a practical amplifier embodying the foregoing principles as actually put into use by me. The tubes 31, 32, 33 and 34 correspond, respectively, to the tubes V1, V2, V3 and V4 in Fig. 1. The tube 33 may consist of one or more tubes connected in parallel, and the same applies to the tube 34. The circuit arrangement of Fig. 2 differs from that of Fig. 1 in having adjustable negative feedback. For this purpose a potentiometer 22 is connected across the output load 24 and is used to set the amount of negative feedback desired.

A novel feature of this amplifier is the absence of all inductive elements excepting the output load 24, which ordinarily is the movable coil of a speaker, or a recording head, etc. Using four type 6082 tubes in the output stage, and germanium power rectifiers, an undistorted output of over 25 watts into a 16 ohm speaker load is obtained.

The input resistor 36 can have any value between 10,000 and one megohm depending on the source impedance. Tube 31 is a type 6AU6. The cathode resistor 38 should be adjusted so that there is approximately one volt negative bias on the tube. Its value will be approximately 4700 ohms. The potentiometer 22 should have a resistance several times the value of the load. If the load is the 16 ohm voice coil of a loudspeaker then its value would be approximately 20 ohms. Capacitor 42 should be between 0.1 and 0.5 mfd. Resistor 44 should be adjusted so that the plate voltage of tube 31 is approximately 100 volts, and its value will generally work out to be from 3 to 5 megohms. The plate resistor 46 is 1.5 megohms. The bypass condenser 48 should be at least several mfd. The tube 32 is a type 6S4. Its plate resistor 50 and cathode resistor 56 each have a value of 33,000 ohms. Coupling condensers 52 and 58 are 0.25 mfd. each. Grid resistors 54 and 60 are 150,000 ohms each. The tubes 64 and 66 are voltage regulator tubes, type VR75, across which the negative bias for the output tubes is developed. The variable resistor 62 controls the current through the tube 64, thus providing a slight adjustment of its regulated voltage. The fuses 68 and 70 are to prevent damage in the event of failure of the bias of the power tubes, for in the absence of bias there would be an excessively heavy current through these tubes. The load 24 is the voice coil of a loudspeaker which is in the neighborhood of 16 ohms. The filter resistor 72 is 10,000 ohms. The output tubes are type 6082 as manufactured by RCA, and in this particular amplifier four of these tubes are used with their filaments connected in series directly across the A. C. line. Tubes 31 and 32 also have their filaments connected in series with a suitable ballast resistor to the A. C. line. The filament wiring of the tubes has not been shown in Fig. 2 in order not to unduly complicate the drawing. The suppressor grid of tube 31 has been omitted in the drawing. It is simply connected directly to the cathode, as in Fig. 1.

Power is obtained from a conventional 110 volt A. C. wall outlet, as indicated by the plug 74. The supply may be fused as indicated at 76. Resistor 77 has a value of two or three ohms to limit the surge current through the power rectifiers 78 and 82, which are either of the selenium or, the more recently developed, germanium type. Condensers 80 and 84 should each have a value of several hundred mfd.

A voltage of about 300 volts is obtained by using a voltage doubler, indicated generally by dotted rectangle 86. This comprises small, 20 milliampere rating, selenium rectifiers 88 and 90 and electrolytic filter condensers 92 and 94. The output of the voltage doubler is used to supply current to the voltage regulator tube 66. Resistor 96 limits the current through the tube and is approximately 33,000 ohms.

The plate supply voltage for tubes 31 and 32 is approximately 450 volts and is obtained from a voltage tripler indicated generally at 100. This comprises selenium rectifiers 102, 104, and 106, which may be similar to rectifiers 88 and 90, and electrolytic filter condensers 108, 110, and 112.

It will be understood that the foregoing values have been given solely by way of an example of the invention, and are not intended to be in limitation thereof.

It is believed that the construction and method of use of my improved power amplifier, as well as the advantages thereof, will be apparent from the foregoing detailed description. The absence of filter chokes or resistors in the power supplies for the output tubes 33 and 34, plus the large value of filter capacitors used, enables large instantaneous currents to be drawn by output tubes 33 and 34 whenever their grid biases approach zero due to signal voltages. It should be appreciated that in the amplification of the complex signals that make up speech and music, the instantaneous power requirements are many times the power averaged over a period of time. What is desired is an amplifier which in the absence of signal input uses a minimum amount of current from its power supplies and a minimum amount of plate dissipation, and which nevertheless when called upon to do so can deliver a large amount of power, without distortion, and within the average plate dissipation of the power tubes. This I have accomplished in a novel and economical manner in the circuit disclosed herein.

It will be apparent that while I have shown and described my invention in several preferred forms, changes may be made in the circuits shown, without departing from the scope of the invention, as sought to be defined in the following claims.

I claim:

1. A transformerless high fidelity low distortion amplifier system for a low impedance load comprising a first voltage amplifier stage having a single-ended input with one terminal grounded and one ungrounded terminal, said stage having a first tube with an anode, a cathode and a control electrode, a biasing arrangement connected directly to said cathode, said low impedance load being connected between said biasing arrangement and said grounded terminal, said control electrode being connected to said ungrounded terminal; a phase splitter stage comprising a second tube having an anode, a cathode and a control electrode, a first output impedance connected to said latter anode, a second output impedance connected to said latter cathode, said latter control electrode being directly conductively connected to said first tube anode, said cathode output impedance being connected to the junction of said first stage biasing arrangement and said load; a common source of plate supply potential for said first and second stages; a push-pull output stage comprising third and fourth tubes, each having a cathode, and anode and a control electrode, said third tube having its control electrode coupled to said second tube anode and having its cathode directly conductively connected to said fourth tube anode, the control electrode of said fourth tube being coupled to the cathode of said second tube; a source of plate supply potential for said third tube connected directly between said third tube anode and ground, a source of plate supply potential for said fourth tube connected between said fourth tube cathode and ground, the cathode of said third tube and the anode of said fourth tube being jointly connected to the said junction between said voltage amplifier stage biasing arrangement and said load, whereby said load carries the discharge current of all said tubes to provide negative feedback for said voltage amplifier stage and for said push-pull output stage and positive feedback for said phase splitter stage.

2. An amplifier system as in claim 1, further including means including respective biasing arrangements for said third and fourth tubes of said push-pull output stage, for providing a discharge current for said fourth tube equal to the sum of the discharge currents of said third tube and said second tube, whereby in the absence of signal to be amplified the resultant current through said load through said output stage tubes and said phase splitter stage tube is zero.

3. A transformerless push-pull amplifier system having a single-ended input and a single-ended output, comprising first and second electron tubes having anode-cathode paths in series with said first tube cathode joined to said second tube anode, a source of plate potential for said first tube coupled directly between its anode and ground, a source of plate potential for said second tube coupled directly between its cathode and ground, a low impedance load connected between said joined anode and cathode and ground, and means for providing a balanced push-pull input to said first and second tubes comprising a phase splitter stage having a single tube with an anode output resistor and a cathode output resistor, said anode output resistor being coupled between grid and plate of said first output tube and said cathode output resistor being coupled between the grid and plate of said second output tube.

4. An amplifier system as in claim 3 further including means causing said second output tube to have a static anode-cathode current equal to the sum of the anode-cathode currents through said first output tube and said phase splitter tube whereby, in the absence of input signal to be amplified, there is zero current through said load.

5. An amplifier system as in claim 4 further including a voltage amplifier stage for supplying said phase splitter stage, said voltage amplifier stage having a single-ended input circuit with one terminal grounded and a second ungrounded terminal to which an input signal is applied, and also having a tube with a control electrode coupled to said second ungrounded terminal, an anode coupled to the control electrode of said phase splitter tube and a cathode coupled to the ungrounded terminal of said load, whereby said load provides negative feedback for said voltage amplifier stage.

6. An arrangement as in claim 5, including a common plate potential supply for said phase splitter and voltage amplifier tubes, said supply being independent of the plate potential supply for said output tubes.

7. An amplifier system as in claim 3 further including a voltage amplifier stage for supplying said phase splitter stage, said voltage amplifier stage having a single-ended input circuit with one terminal grounded and a second ungrounded terminal to which an input signal is applied, and also having a tube with a control electrode coupled to said second ungrounded terminal, an anode coupled to the control electrode of said phase splitter tube and a cathode coupled to the ungrounded terminal of said load, whereby said load provides negative feedback for said voltage amplifier stage.

8. An amplifier system as in claim 3 further comprising means connecting said phase splitter stage cathode output resistor to the ungrounded terminal of said load, whereby said phase splitter stage has positive feedback resulting in lower input voltage requirement.

9. A transformerless amplifier system comprising a push-pull output stage comprising first and second electron tubes having anode-cathode paths in series with said first tube cathode coupled to said second tube anode, a source of plate potential for said first tube coupled between its anode and ground, a source of plate potential for said second tube coupled between its cathode and ground, a load connected between said second tube anode and ground, a single tube phase splitter stage having two outputs coupled respectively to the grid-anode input circuits of said first and second output tubes, and means connecting said load in the anode-cathode current path of said phase splitter tube.

10. An amplifier system as in claim 9, further including a voltage amplifier stage, means coupling the output of said voltage amplifier stage to the input of said phase splitter stage, said voltage amplifier stage having a tube with anode and cathode, and means coupling said load in the anode-cathode current path of said last-named tube.

11. A transformerless amplifier system comprising a push-pull output stage comprising first and second electron tubes having anode-cathode paths in series with said first tube cathode coupled to said second tube anode, means supplying plate potential to both said tubes, a load coupled between said second tube anode and ground, a phase splitter stage having two outputs coupled respectively to said output stage grid-anode circuits, said phase splitter stage comprising a tube having an anode and cathode, and means coupling said load in the anode-cathode current path of said latter tube.

12. An amplifier system as in claim 11, further including a voltage amplifier stage, means coupling the output of said voltage amplifier stage to the input of said phase splitter stage, said voltage amplifier stage having a tube with anode and cathode, and means coupling said load in the anode-cathode current path of said last-named tube.

13. An amplifier system as in claim 9 wherein said potential sources each include low-impedance rectifier means and filter capacitors of the order of several hundred microfarads in capacitance, whereby peak power requirements of said tubes may be supplied substantially instantaneously to avoid distortion.

References Cited in the file of this patent

UNITED STATES PATENTS

| | | |
|---|---|---|
| 2,160,788 | Riddle | May 30, 1939 |
| 2,358,428 | White | Sept. 19, 1944 |
| 2,383,867 | Koch | Aug. 28, 1945 |
| 2,428,295 | Scantlebury | Sept. 30, 1947 |
| 2,659,775 | Coulter | Nov. 17, 1953 |

OTHER REFERENCES

Terman: "Radio Engineering," third edition (McGraw-Hill) 1947, pp. 301–304 and pp. 552–554.

Artzt article No. 389, "Survey of D. C. Amplifiers," RCA Laboratories, reprint from August 1945 issue of Electronics.

Gen. Rad. Experimenter, October 1951, pub. 1951 by Gen. Radio Co., Cambridge, Mass.

Brewer article, Jnl. Sci. Insts., March 1953, pp. 91–92.

Sulzer article, Audio Engineering, May 1951, pp. 15, 46, 47, 48.